United States Patent
Lin et al.

(10) Patent No.: US 11,502,868 B2
(45) Date of Patent: Nov. 15, 2022

(54) DECT NETWORK CLUSTERING METHOD

(71) Applicant: YEALINK (XIAMEN) NETWORK TECHNOLOGY CO., LTD., Fujian (CN)

(72) Inventors: Yanzhang Lin, Fujian (CN); Wanjian Feng, Fujian (CN); Lianchang Zhang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/025,780

(22) Filed: Sep. 18, 2020

(65) Prior Publication Data

US 2021/0083888 A1  Mar. 18, 2021

(30) Foreign Application Priority Data

Sep. 18, 2019 (CN) .......................... 201910882401.7

(51) Int. Cl.
*H04L 12/18* (2006.01)
*H04L 69/16* (2022.01)

(52) U.S. Cl.
CPC ............ *H04L 12/189* (2013.01); *H04L 69/16* (2013.01)

(58) Field of Classification Search
CPC ... H04L 12/189; H04L 69/16; H04M 2250/08
See application file for complete search history.

(56) References Cited

U.S. PATENT DOCUMENTS

| | | | | |
|---|---|---|---|---|
| 7,573,881 B2* | 8/2009 | Cain | ...................... | H04L 63/104 370/408 |
| 8,284,773 B1* | 10/2012 | Woleben | ................ | H04L 12/189 709/227 |
| 10,798,625 B2* | 10/2020 | Viox | ........................ | H04W 4/06 |
| 2002/0114302 A1* | 8/2002 | McDonald | ............ | H04L 1/1854 370/432 |
| 2011/0103354 A1* | 5/2011 | Deng | ..................... | H04W 88/04 370/338 |
| 2012/0163277 A1* | 6/2012 | Kim | ....................... | H04L 12/189 370/312 |
| 2013/0139210 A1* | 5/2013 | Huang | ............... | H04N 21/6405 725/109 |
| 2019/0215327 A1* | 7/2019 | Murthy | ................. | H04L 63/107 |
| 2019/0281516 A1* | 9/2019 | Viox | ..................... | H04W 36/08 |

\* cited by examiner

*Primary Examiner* — Mohamed A. Wasel

(57) ABSTRACT

A DECT network clustering method includes sending, by a DECT host to a router, a multicast command that declares joining a specified multicast group; sending, by a DECT device to the router, a multicast probe message sent to a target multicast group; receiving, by the router, the multicast command and the multicast probe message, and sending, to the DECT host according to the multicast command, the multicast probe message; receiving, by the DECT host, the multicast probe message, and sending status declaration information to the DECT device; receiving, by the DECT device, the status declaration information, and initiating a TCP connection request to the DECT host in a point-to-point manner; and receiving, by the DECT host, the connection request from the DECT device, and establishing a TCP channel with the DECT device.

8 Claims, 6 Drawing Sheets

DECT NETWORK CLUSTERING METHOD

CROSS REFERENCES

This application claims priority to Chinese Application Number 201910882401.7, filed on Sep. 18, 2019, which is herein incorporated by reference.

TECHNICAL FIELD

The disclosure relates to Digital Enhanced Cordless Telecommunications (DECT), and in particular, to a DECT network clustering system and clustering method.

BACKGROUND

DECT has limited wireless coverage, and a handle is incapable of communication once leaving the wireless coverage of an original Base. In this case, DECT clustering emerges. The DECT clustering in the prior art adopts a broadcast technology, which requires high network bandwidth, resulting in poor DECT experience.

SUMMARY

To solve at least one of the foregoing technical problems, the disclosure provides a DECT network clustering system and clustering method, to reduce the requirement on network bandwidth.

In a first aspect of the disclosure, a DECT network clustering method is provided, including:

sending, by a DECT host to a router, a multicast command that declares joining a specified multicast group;

sending, by a DECT device to the router, a multicast probe message sent to a target multicast group;

receiving, by the router, the multicast command and the multicast probe message, and sending, to the DECT host according to the multicast command, the multicast probe message of which the target multicast group is the specified multicast group;

receiving, by the DECT host, the multicast probe message, and sending status declaration information to the DECT device in a point-to-point manner according to the multicast probe message;

receiving, by the DECT device, the status declaration information, and initiating a Transmission Control Protocol (TCP) connection request to the DECT host in a point-to-point manner according to the status declaration information; and receiving, by the DECT host, the connection request from the DECT device, and establishing a TCP channel with the DECT device.

Optionally, the multicast probe message includes a first multicast group ID, a Media Access Control (MAC) address of the DECT device and a first verification feature code;

the sending status declaration information to the DECT device in a point-to-point manner according to the multicast probe message includes: sending the status declaration information to the DECT device in a point-to-point manner based on a User Datagram Protocol (UDP) according to the MAC address of the multicast probe message after it is determined that the first multicast group ID is the same as a multicast group ID of the DECT host and the first verification feature code of the multicast probe message is verified.

Optionally, the status declaration information includes a second multicast group ID and a second verification feature code;

after receiving the status declaration information, the DECT device further sends an acknowledgment message to the DECT host after it is determined that the second multicast group ID is the same as a multicast group ID of the DECT device and the second verification feature code of the status declaration information is verified; and after sending the status declaration information to the DECT device in a point-to-point manner according to the multicast probe message, the DECT host further retransmits the status declaration information at intervals of first preset duration if the acknowledgment message of the DECT device is not received and the number of retransmissions is less than a specified value.

Optionally, the status declaration information includes an IP address and a TCP listening port of the DECT host;

the initiating a TCP protocol connection request to the DECT host in a point-to-point manner according to the status declaration information includes: obtaining the IP address and the TCP listening port of the DECT host from the status declaration information, and initiating the TCP protocol connection request to the DECT host based on the IP address and the TCP listening port of the DECT host.

Optionally, after sending to the router the multicast probe message sent to the target multicast group, the DECT device retransmits the multicast probe message at intervals of second preset duration before the TCP channel is established between the DECT device and the DECT host.

In a second aspect of the disclosure, a DECT network clustering method is provided, including:

sending, to a router, a multicast command that declares joining a specified multicast group;

receiving a multicast probe message that is sent by a DECT device to the specified multicast group and distributed by the router;

sending status declaration information to the DECT device in a point-to-point manner based on the multicast probe message, to trigger the DECT device to initiate a Transmission Control Protocol (TCP) connection request; and receiving the TCP protocol connection request initiated by the DECT device, to establish a TCP channel with the DECT device.

In a third aspect of the disclosure, a DECT network clustering method is provided, including:

sending, to a router, a multicast probe message sent to a target multicast group, where the multicast probe message includes a Media Access Control (MAC) address of a DECT device;

receiving status declaration information sent by a DECT host, and sending a Transmission Control Protocol (TCP) connection request to the DECT host according to the status declaration information, to establish a TCP channel.

In a fourth aspect of the disclosure, a DECT host is provided, including:

a multicast probe service module, configured to send, to a router, a multicast command that declares joining a specified multicast group, and receive a multicast probe message that is sent by a DECT device to the specified multicast group and distributed by the router;

a control module, configured to send status declaration information to the DECT device in a point-to-point manner based on the multicast probe message, to trigger the DECT device to initiate a Transmission Control Protocol (TCP) connection request; and a data communication service module, configured to receive the TCP protocol connection request initiated by the DECT device, to establish a TCP channel with the DECT device.

In a fifth aspect of the disclosure, a DECT device is provided, including:

a multicast probe client module, configured to send, to a router, a multicast probe message sent to a target multicast group, where the multicast probe message includes a Media Access Control (MAC) address of the DECT device; and a data communication client module, configured to receive status declaration information sent by a DECT host, and send a Transmission Control Protocol (TCP) connection request to the DECT host according to the status declaration information, to establish a TCP channel.

In a sixth aspect of the disclosure, a DECT network clustering system is provided, including the DECT host in the fourth aspect and the DECT device in the fifth aspect.

In the technical solution of the disclosure, a multicast probe message is a multicast message, and based on a multicast protocol, it is unnecessary to broadcast the message. Meanwhile, both status declaration information and a connection request are sent in a point-to-point manner, which greatly reduces the bandwidth requirement of clustering communication, and reduces impact on the network bandwidth.

BRIEF DESCRIPTION OF THE DRAWINGS

The accompanying drawings illustrate exemplary implementations of the disclosure, and are intended to explain the principles of the disclosure together with the description thereof. The accompanying drawings are included to provide a further understanding of the disclosure, and are included in and constitute part of the specification.

DETAILED DESCRIPTION

The present disclosure is described in further detail below with reference to the accompanying drawings and implementations. It should be understood that the specific implementations described herein are merely intended to explain related content, rather than to limit the disclosure. It should also be noted that, for convenience of description, only the parts related to the disclosure are shown in the accompany drawings.

It should be noted that, in case of no conflict, the implementations in the disclosure and the features in the implementations may be combined with each other. The disclosure is described in detail below with reference to the accompanying drawings and implementations.

Some of the terms are explained blow:

DECT: Digital Enhanced Cordless Telecommunications.

DECT clustering: all devices with a DECT service are associated in terms of services, to communicate with each other.

Base: a DECT device with a Voice over Internet Protocol (VOIP) service (which may be construed as a Mini base station similar to a cell phone), also referred to as a DECT device in this application.

Handle: a wireless device connected to a Base.

DM: a host that performs service clustering on all Bases in a local area network, also referred to as a DECT host in this application.

Multicast protocol: Multicast, which implements a one-to-many connection from a transmitter to receivers.

Embodiment 1

Figure 1:
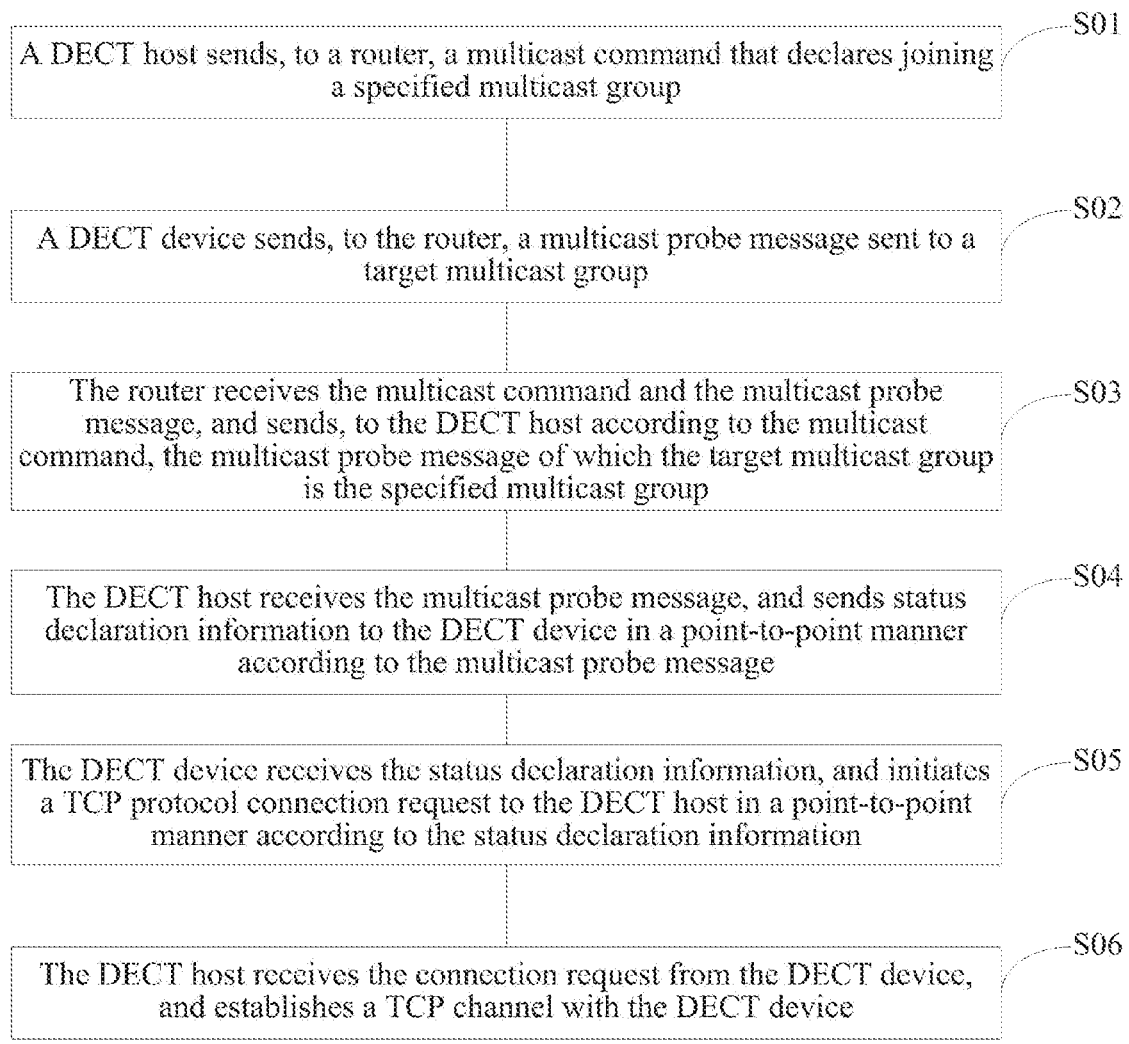
FIG. 1 is a flowchart of a DECT network clustering method according to an embodiment of the disclosure.
Figure 2:
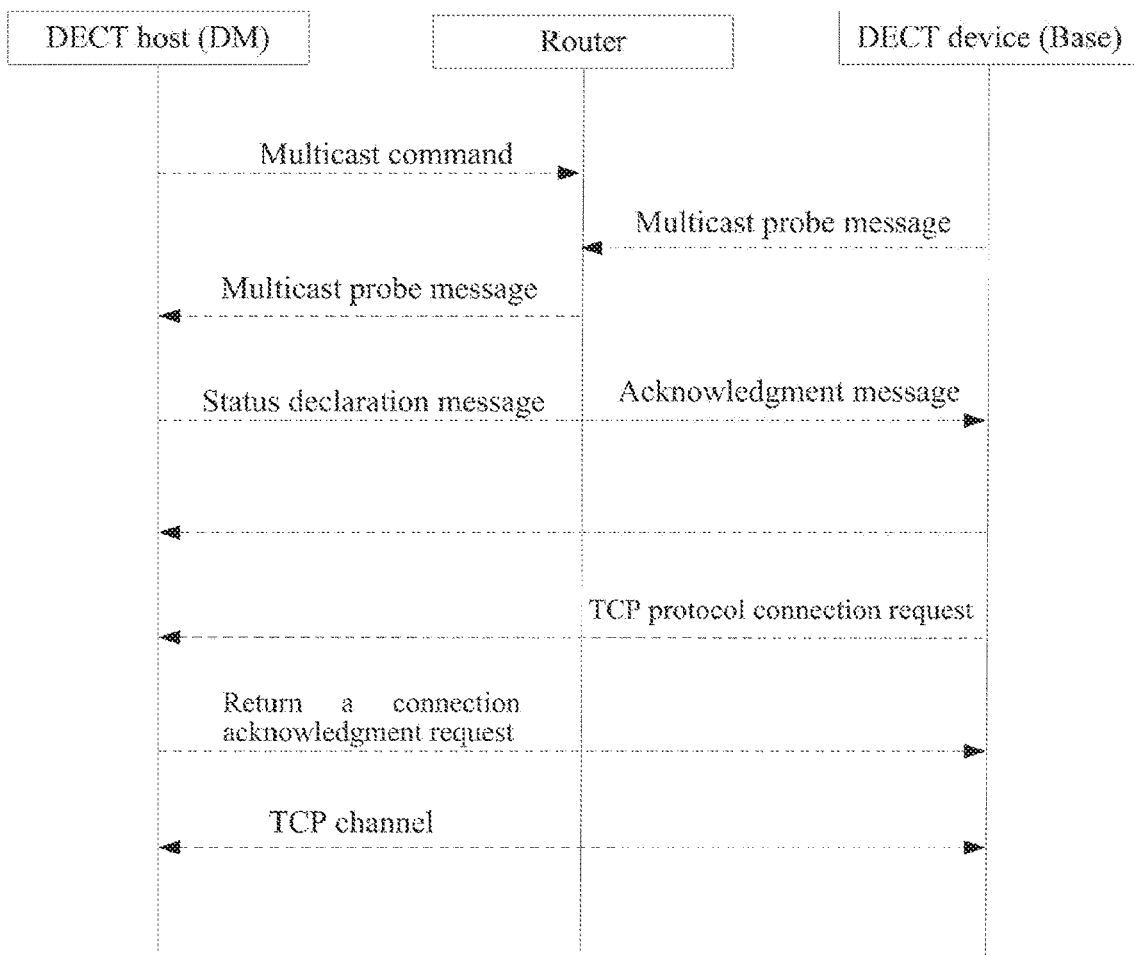
FIG. 2 is a schematic diagram of data transmission of a DECT network clustering method according to an embodiment of the disclosure.

As shown in FIG. 1 and FIG. 2, a DECT network clustering method includes the following steps:

Step S01: a DECT host sends, to a router, a multicast command that declares joining a specified multicast group.

Step S02: a DECT device sends, to the router, a multicast probe message sent to a target multicast group.

Step S03: the router receives the multicast command and the multicast probe message, and sends, to the DECT host according to the multicast command, the multicast probe message of which the target multicast group is the specified multicast group.

Step S04: the DECT host receives the multicast probe message, and sends status declaration information to the DECT device in a point-to-point manner according to the multicast probe message.

Step S05: the DECT device receives the status declaration information, and initiates a Transmission Control Protocol (TCP) connection request to the DECT host in a point-to-point manner according to the status declaration information.

Step S06: the DECT host receives the connection request from the DECT device, and establishes a TCP channel with the DECT device.

In this implementation, step S01 may be performed after the DECT host is started, to send to the router the multicast command that declares joining the specified multicast group. If the router receives network data sent to the specified multicast group, the router sends a copy of the message to the DECT host. The message used in the disclosure is the multicast probe message sent by the DECT device to the target multicast group. The specified multicast group may be expressed by using a multicast address, such as 224.2.10.10.

Step S02 may be performed after the DECT device is started, to send to the router the multicast probe message sent to the target multicast group. The multicast probe message includes address information of the DECT device, such as a Media Access Control (MAC) address of the DECT device, so that the DECT host can send the status declaration information to the DECT device in a point-to-point manner according to the multicast probe message. The status declaration information no longer needs to be sent through a multicast protocol, thus reducing impact on the network bandwidth.

In step S03, the router receives the multicast command and the multicast probe message, and sends, to the DECT host according to the multicast command, the multicast probe message of which the target multicast group is the specified multicast group, so that the DECT host can receive the corresponding multicast probe message.

In step S04, the DECT host receives the multicast probe message, and sends the status declaration information to the DECT device according to the multicast probe message. The DECT host sends the status declaration information to the corresponding DECT device according to the address information contained in the multicast probe message. The DECT device determines a DECT host address by using the status declaration information, and then initiates the TCP protocol connection request to the corresponding DECT host according to the status declaration information. In the status declaration information, information used by the DECT device to determine the DECT host address may be an IP address and a TCP listening port of the DECT host. The status declaration information may further include a MAC address of the DECT host.

In step S05, the DECT device receives the status declaration information, and initiates the TCP protocol connection request to the DECT host according to the status declaration information. That is, the DECT device initiates the TCP protocol connection request to the DECT host according to the information, which helps the DECT device to determine the DECT host address, in the status declaration information.

In step S06, the DECT host receives the connection request from the DECT device, and establishes the TCP channel with the DECT device.

By repeating steps S02 to S06, the DECT host and other DECT devices in a local area network may establish TCP channels, thereby implementing clustering of a DECT network and improving DECT experience.

According to the method in the disclosure, the multicast probe message in step S02 and step S03 is a multicast message, and multicast protocol communication is adopted, so that broadcasting is not needed, thereby reducing a bandwidth requirement. Moreover, step S04 to step S06 do not need to adopt multicast protocol communication, but adopt point-to-point interaction, thus further reducing impact on the network bandwidth.

As can be learned, the step of establishing a TCP channel with the DECT device by the DECT host includes returning a connection acknowledgment request to the DECT device. The TCP channel may be established through three handshakes, and details are not described in the disclosure.

In an optional implementation, the multicast probe message includes a first multicast group ID, a MAC address of the DECT device, and a first verification feature code.

The step of sending status declaration information to the DECT device in a point-to-point manner according to the multicast probe message includes: sending the status declaration information to the DECT device in a point-to-point manner based on a User Datagram Protocol (UDP) according to the MAC address of the multicast probe message after it is determined that the first multicast group ID is the same as a multicast group ID of the DECT host and the first verification feature code of the multicast probe message is verified.

In this implementation, the multicast probe message is verified according to the first multicast group ID and the first verification feature code, to ensure that data of the multicast probe message is correct and that the multicast group of the DECT device is the same as the multicast group of the DECT host.

In an optional implementation, the status declaration information includes a second multicast group ID and a second verification feature code.

After receiving the status declaration information, the DECT device sends an acknowledgment message to the DECT host after it is determined that the second multicast group ID is the same as a multicast group ID of the DECT device and the second verification feature code of the status declaration information is verified.

After sending the status declaration information to the DECT device in a point-to-point manner according to the multicast probe message, the DECT host retransmits the status declaration information at intervals of first preset duration if the acknowledgment message of the DECT device is not received and the number of retransmissions is less than a specified value.

In this implementation, the DECT device verifies the status declaration information according to the second multicast group ID and the second verification feature code, to ensure that data of the status declaration information is correct and that the multicast group of the DECT host is the same as the multicast group of the DECT device, thus ensuring correctness of the data. The DECT host determines, based on the acknowledgment message of the DECT device, whether to retransmit the status declaration information, so that the status declaration information can be received normally by the DECT device. The specified value may be set according to requirements, for example, set to 64. The first preset duration may be set according to requirements, for example, 1 s or 2 s. The first preset duration may be increased progressively, for example, the first interval is 1 s and the second interval is 2 s.

In an optional implementation, the status declaration information includes an IP address and a TCP listening port of the DECT host.

The step of initiating a TCP protocol connection request to the DECT host in a point-to-point manner according to the status declaration information includes: obtaining the IP address and the TCP listening port of the DECT host from the status declaration information, and initiating the TCP protocol connection request to the DECT host based on the IP address and the TCP listening port of the DECT host.

In an optional implementation, after sending to the router the multicast probe message sent to the target multicast group, the DECT device retransmits the multicast probe message at intervals of second preset duration before the TCP channel is established between the DECT device and the DECT host; the second preset duration may be T seconds, where T seconds may be 20 seconds.

Embodiment 2

Figure 3:
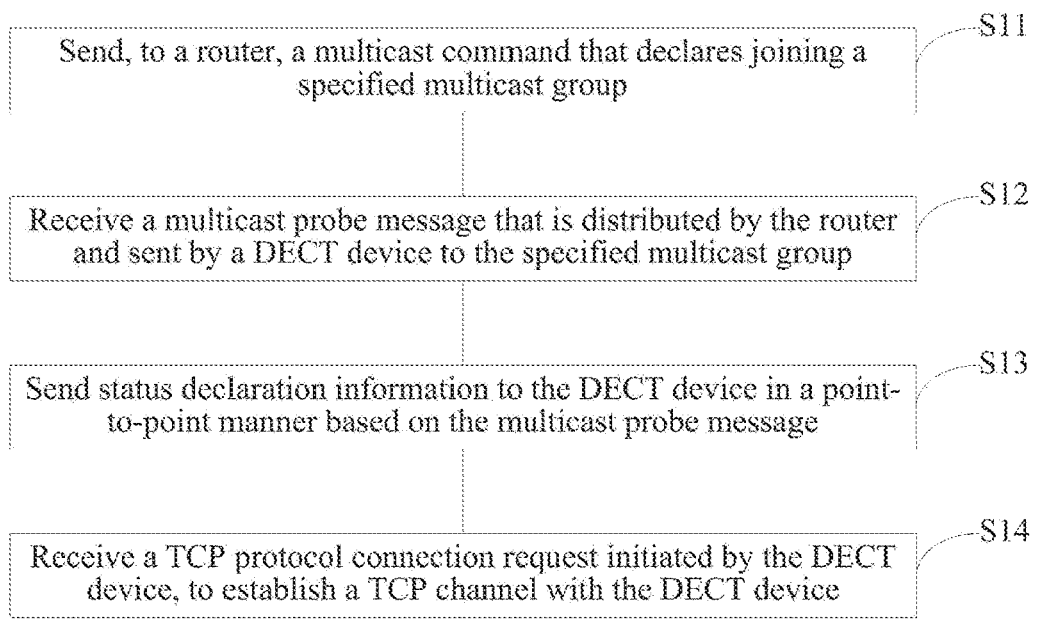
FIG. 3 is another flowchart of a DECT network clustering method according another to an embodiment of the disclosure.

As shown in FIG. 3, a DECT network clustering method includes the following steps:

Step S11: send, to a router, a multicast command that declares joining a specified multicast group.

Step S12: receive a multicast probe message that is sent by a DECT device to the specified multicast group and distributed by the router.

Step S13: send status declaration information to the DECT device in a point-to-point manner based on the multicast probe message, to trigger the DECT device to initiate a TCP protocol connection request.

Step S14: receive the TCP protocol connection request initiated by the DECT device, to establish a TCP channel with the DECT device.

This embodiment illustrates steps performed by the DECT host in Embodiment 1, and has the same optional steps, beneficial effects and principle as Embodiment 1, which are not described again in this embodiment.

Embodiment 3

Figure 4:
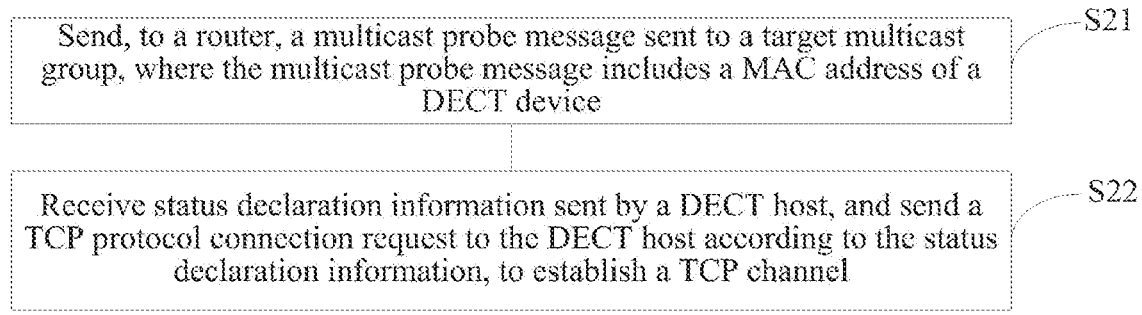
FIG. 4 is another flowchart of a DECT network clustering method according another to an embodiment of the disclosure.

As shown in FIG. 4, a DECT network clustering method includes the following steps:

Step S21: send, to a router, a multicast probe message sent to a target multicast group, where the multicast probe message includes a MAC address of a DECT device.

Step S22: receive status declaration information sent by a DECT host, and send a TCP protocol connection request to the DECT host according to the status declaration information, to establish a TCP channel.

This embodiment illustrates steps performed by the DECT device in Embodiment 1, and has the same optional steps, beneficial effects and principle as Embodiment 1, which are not described again in this embodiment.

Embodiment 4

Figure 5:
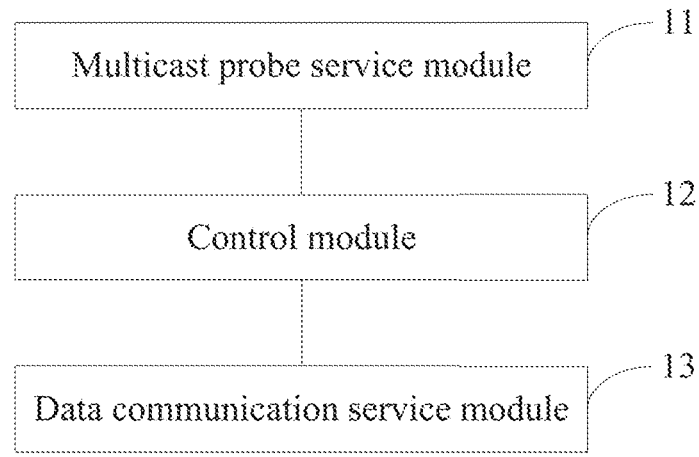
FIG. 5 is a schematic diagram of a DECT host according to an embodiment of the disclosure.

As shown in FIG. 5, a DECT host includes:

a multicast probe service module 11, configured to send, to a router, a multicast command that declares joining a specified multicast group, and receive a multicast probe message that is sent by a DECT device to the specified multicast group and distributed by the router;

a control module 12, configured to send status declaration information to the DECT device in a point-to-point manner based on the multicast probe message, to trigger the DECT device to initiate a TCP protocol connection request; and a data communication service module 13, configured to receive the TCP protocol connection request initiated by the DECT device, to establish a TCP channel with the DECT device.

Optionally, the multicast probe message includes a first multicast group ID, a MAC address of the DECT device, and a first verification feature code.

The operation of sending status declaration information to the DECT device in a point-to-point manner based on the multicast probe message includes: sending the status declaration information to the DECT device after it is determined that the first multicast group ID is the same as a multicast group ID of the DECT host and the first verification feature code of the multicast probe message is verified; and sending the status declaration information to the DECT device in a point-to-point manner based on a UDP protocol according to the MAC address of the multicast probe message.

The DECT host in this embodiment is the subject for performing the method in Embodiment 2 and is configured to implement the method in Embodiment 2; the beneficial effects and principle of this embodiment correspond to those in Embodiment 2, which are not described again in this embodiment.

Embodiment 5

Figure 6:
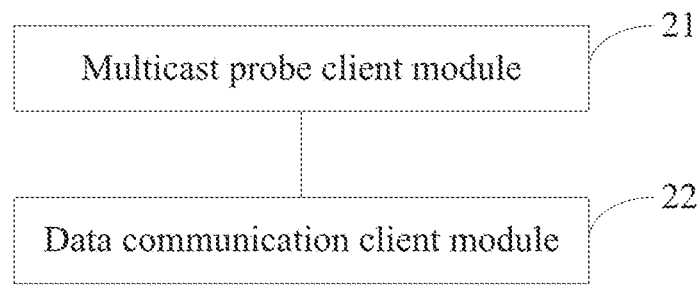
FIG. 6 is a schematic diagram of a DECT device according to an embodiment of the disclosure.

As shown in FIG. 6, a DECT device includes:

a multicast probe client module 22, configured to send, to a router, a multicast probe message sent to a target multicast group, where the multicast probe message includes a MAC address of the DECT device; and a data communication client module 23, configured to receive status declaration information sent by a DECT host, and send a TCP protocol connection request to the DECT host according to the status declaration information, to establish a TCP channel.

The multicast probe client module 22 is further configured to: after sending to the router the multicast probe message sent to the target multicast group, retransmit a multicast probe message, of which a destination address is a first multicast address, to the router if the DECT device does not establish a TCP channel with the DECT host within a preset time.

The data communication client module 23 is further configured to: after receiving the status declaration information, send an acknowledgment message to the DECT host after it is determined that a second multicast group ID is the same as a multicast group ID of the DECT device and a second verification feature code of the status declaration information is verified.

After sending the status declaration information to the DECT device in a point-to-point manner according to the multicast probe message, the DECT host further retransmits the status declaration information at intervals of first preset duration if the acknowledgment message of the DECT device is not received and the number of retransmissions is less than a specified value.

The status declaration information includes an IP address and a TCP listening port of the DECT host.

In the embodiment of the present disclosure, the multicast probe service module 11, the control module 12, and the data communication service module 13 in the DECT host, and the multicast probe client module 22 and the data communication client module 23 in the DECT device may each be a processor or integrated chip with a wireless communication interface. The wireless communication interface can support one or more of a WIFI transmission protocol, Bluetooth transmission protocol, Zigbee transmission protocol, or radio frequency (RF) transmission protocol.

According to another aspect of the disclosure, a DECT network clustering system includes a DECT host according to the second aspect of the disclosure and a DECT device according to the third aspect of the disclosure.

The DECT device in this embodiment is the subject for performing the method in Embodiment 3 and is configured to implement the method in Embodiment 3; the beneficial effects and principle of this embodiment correspond to those in Embodiment 3, which are not described again in this embodiment.

Embodiment 6

Figure 7:
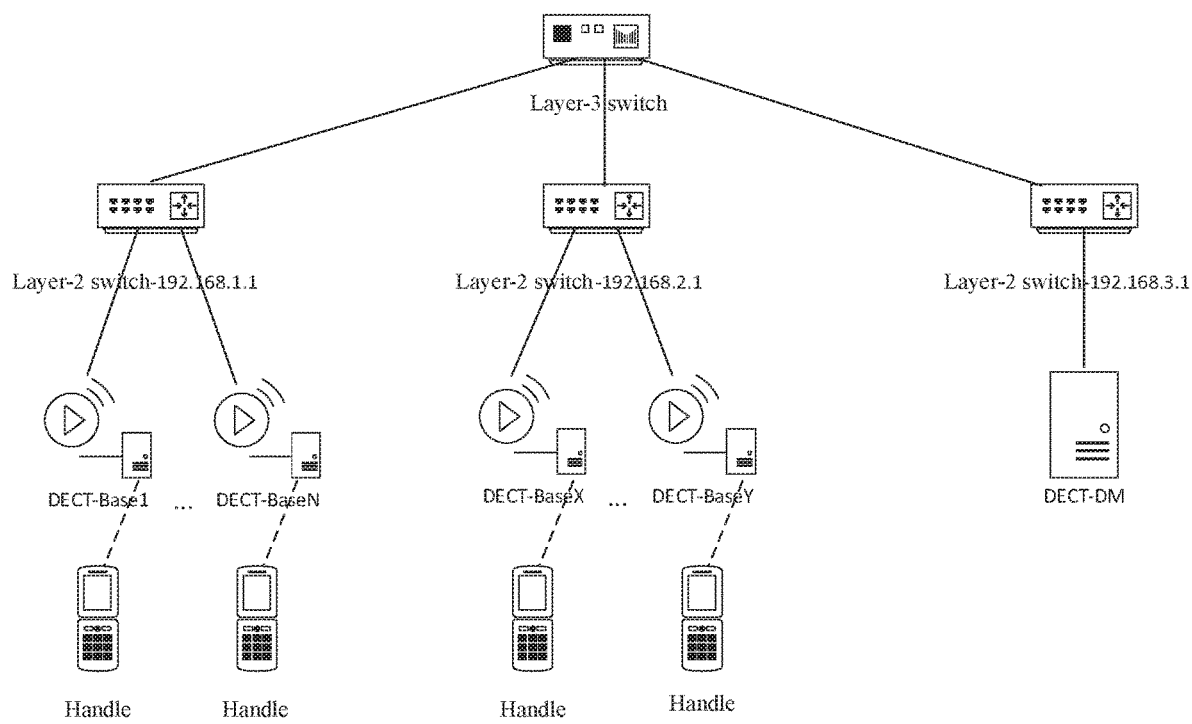
FIG. 7 is a diagram of a network layout containing a DECT device according to an embodiment of the disclosure.

A network layout containing a DECT device is shown in FIG. 7, where DECT-DM represents a DECT host, and a DECT-Base represents a DECT device. A Layer-3 switch is a router described below.

Figure 8:
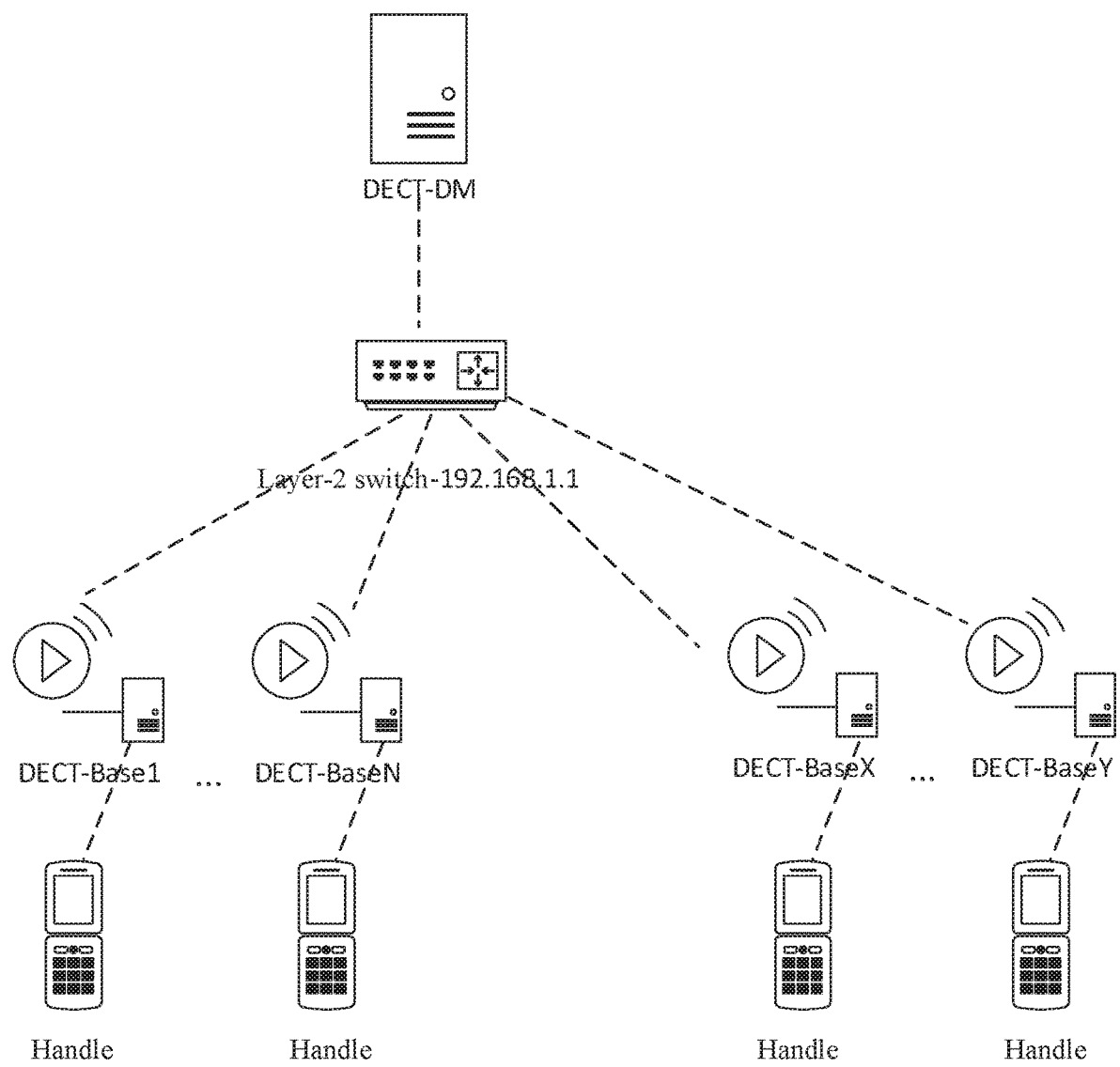
FIG. 8 is a diagram of a network system after clustering according to an embodiment of the disclosure.

A system obtained after clustering according to the method in the disclosure is shown in FIG. 8.

For ease of understanding, private messages are explained first:

Client_Discover_Msg:

Client_Discover_Msg is a multicast probe message of a Base sent to a multicast address gIP (where the multicast address is, for example, 224.2.10.10, which is a gIP agreed on by the DM and the Base). The message consists of a Group ID (GID), MAC (namely, a MAC address of the Base), and a feature code, where the GID represents a group ID. There may be a plurality of DECT clustering systems in the same local area network, which are distinguished by GIDs. GIDs of the DM and the Base need to be consistent. The MAC represents the MAC address of the Base. The feature code is some extra information of the Base, and participates in security verification of the DM.

Server_Status_Msg:

Server_Status_Msg is a status declaration message of the DM, which is a point-to-point UDP message consisting of GID, MAC, IP, PORT, and a feature code. For the definition of the GID, refer to the description above. The MAC represents a MAC address of the DM. The IP and PORT represent an IP address and a TCP listening port of the DM (the Base subsequently initiates a TCP connection by using the IP and the PORT). The feature code is some extra information of the DM, and participates in security verification of the Base.

Clinet_Ack_Msg:

Clinet_Ack_Msg is an acknowledgment message replied by the Base to Server_Status_Msg, and is used for informing the DM that the Server_Status_Msg message has been received.

Figure 9:
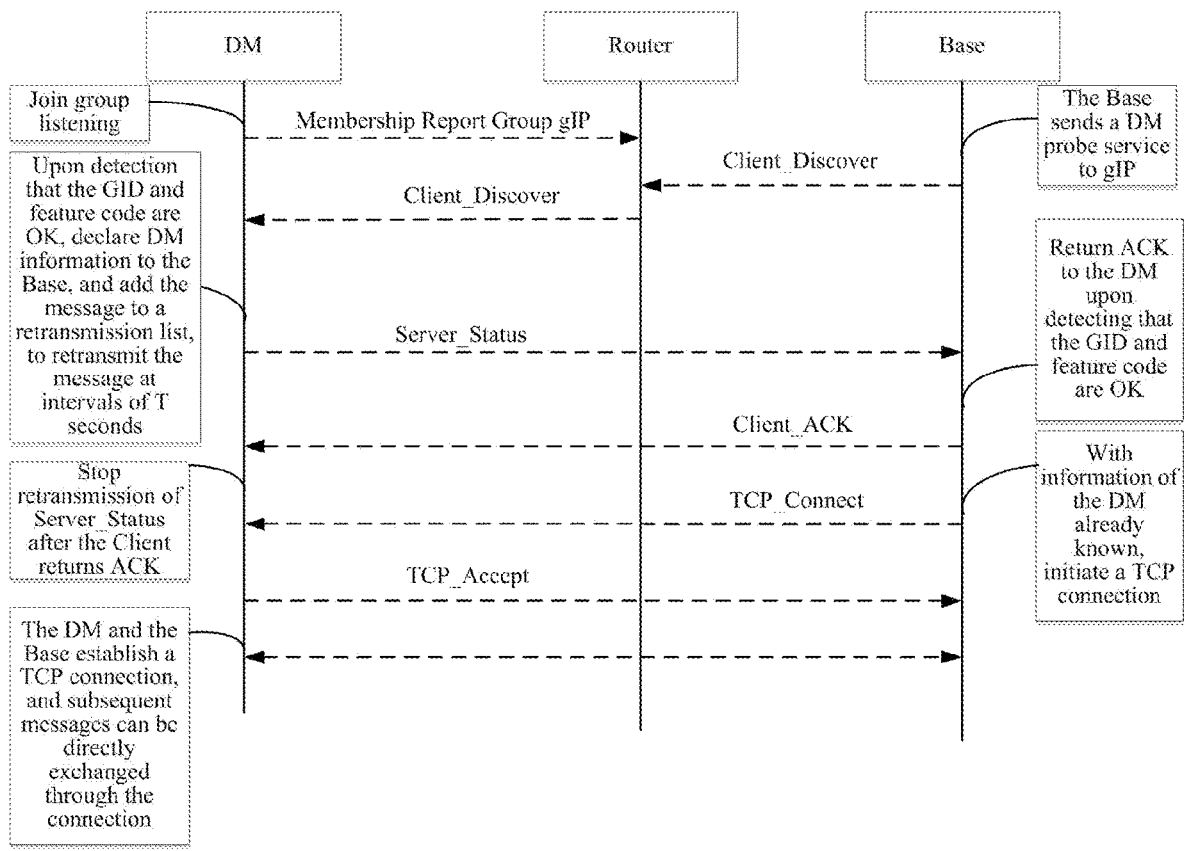
FIG. 9 is a schematic flowchart of data transmission of a DECT network clustering method according to an embodiment of the disclosure.

As shown in FIG. 9, the clustering method is as follows:

After being started, the DM declares to the router that the DM joins a gIP multicast group. As long as the router receives network data of which a destination address is gIP, the router sends a copy of the message to the DM. The network data herein generally refers to all kinds of network packets, and mainly refers to the multicast probe message of the Base; gIP generally refers to a certain multicast IP address, for example, a multicast address such as 224.2.10.10.

After being started, the Base sends, to the router, a multicast probe message of which a destination address is gIP: Client_Discover_Msg. Before the Base establishes a TCP connection with the DM, the Base retransmits the probe message at intervals of T seconds (which is 20 s by default, and may be externally controlled).

After receiving Client_Discover_Msg of the Base, the DM verifies whether the GID in the message is the same as the GID of the DM, and verifies information of the Base by using the verification feature code. After the verification succeeds, the DM sends the Server_Status_Msg message (for definition, refer to the description above) to the Base in a point-to-point manner. Before receiving the ACK acknowledgment message of the Base, the DM retransmits the Server_Status_Msg message at intervals of T seconds (which is 1 s, 2 s, 4 s, 16 s, 16 s . . . ), and stops the retransmission upon reaching the maximum number of retransmissions 64.

After receiving Server_Status_Msg, the Base verifies whether the GID in the message is the same as the GID of the Base, and verifies information of the DM by using the verification feature code. After the verification succeeds, the Base sends Clinet_Ack_Msg to the DM in a point-to-point manner.

After receiving Clinet_Ack_Msg, the DM stops retransmitting Server_Status_Msg to the Base.

The Base has obtained the IP address and the TCP listening port of the DM, and therefore initiates a TCP protocol connection request to the DM. The DM accepts the request, and returns a connection acknowledgment request. After the Base and the DM establish a TCP channel, the Base stops DM probing. Subsequently, during communication, the DM and the Base may directly interact with each other through the channel connection.

The DM and other Bases in the local area network repeat the process of 2 to 6, to gradually construct a DECT network clustering system.

In the description of this specification, the description of the terms "one example/implementation", "some examples/implementations", "example", "specific example" and "some examples" etc. means that the specific features, structures, materials or characteristics described with reference to the example/implementation or example are included in at least one example/implementation or example of this application. In this specification, the illustrative expressions of the above terms are not intended to refer to the same example/implementation or example. Moreover, the particular features, structures, materials or characteristics described may be combined in any suitable manner in any one or more examples/implementations or examples. In addition, those skilled in the art may combine different examples/implementations described herein or examples or features in different examples/implementations or examples without any contradiction.

Moreover, the terms such as "first" and "second" are used only for the purpose of description and cannot be understood as indicating or implying relative importance or implicitly indicating the number of technical features indicated. Therefore, features defined by "first" and "second" may explicitly or implicitly include at least one of the features. In description of this application, "a plurality of" means at least two, for example, two or three, unless otherwise clearly and specifically limited.

Those skilled in the art should understand that the foregoing implementations are merely intended to describe the disclosure clearly, rather than to limit the scope of the disclosure. Those skilled in the art may make other changes or modifications based on the foregoing disclosure, but these changes or modifications should fall within the scope of the disclosure.

The invention claimed is:

1. A Digital Enhanced Cordless Telecommunications (DECT) network clustering method, comprising:
    sending, by a DECT host to a router, a multicast command that declares joining a specified multicast group;
    sending, by a DECT device to the router, a multicast probe message sent to a target multicast group;
    receiving, by the router, the multicast command and the multicast probe message, and sending, to the DECT host according to the multicast command, the multicast probe message of which the target multicast group is the specified multicast group;
    receiving, by the DECT host, the multicast probe message, and sending status declaration information to the DECT device in a point-to-point manner according to the multicast probe message;
    receiving, by the DECT device, the status declaration information, and initiating a Transmission Control Protocol (TCP) connection request to the DECT host in a point-to-point manner according to the status declaration information; and
    receiving, by the DECT host, the connection request from the DECT device, and establishing a TCP channel with the DECT device;
    wherein after sending to the router the multicast probe message sent to the target multicast group, the DECT device retransmits the multicast probe message at intervals of second preset duration before the TCP channel is established between the DECT device and the DECT host.

2. The method according to claim 1, wherein the multicast probe message comprises a first multicast group ID, a Media Access Control (MAC) address of the DECT device and a first verification feature code;
- the sending status declaration information to the DECT device in a point-to-point manner according to the multicast probe message comprises: sending the status declaration information to the DECT device in a point-to-point manner based on a User Datagram Protocol (UDP) according to the MAC address of the multicast probe message after it is determined that the first multicast group ID is the same as a multicast group ID of the DECT host and the first verification feature code of the multicast probe message is verified.

3. The method according to claim 1, wherein the status declaration information comprises a second multicast group ID and a second verification feature code;
- after receiving the status declaration information, the DECT device further sends an acknowledgment message to the DECT host after it is determined that the second multicast group ID is the same as a multicast group ID of the DECT device and the second verification feature code of the status declaration information is verified; and
- after sending the status declaration information to the DECT device in a point-to-point manner according to the multicast probe message, the DECT host further retransmits the status declaration information at intervals of first preset duration if the acknowledgment message of the DECT device is not received and the number of retransmissions is less than a specified value.

4. The method according to claim 1, wherein the status declaration information comprises an IP address and a TCP listening port of the DECT host;
- the initiating a TCP protocol connection request to the DECT host in a point-to-point manner according to the status declaration information comprises: obtaining the IP address and the TCP listening port of the DECT host from the status declaration information, and initiating the TCP protocol connection request to the DECT host based on the IP address and the TCP listening port of the DECT host.

5. A Digital Enhanced Cordless Telecommunications (DECT) network clustering method, comprising:
- sending, to a router, a multicast command that declares joining a specified multicast group;
- receiving a multicast probe message that is sent by a DECT device to the specified multicast group and distributed by the router;
- sending status declaration information to the DECT device in a point-to-point manner based on the multicast probe message, to trigger the DECT device to initiate a Transmission Control Protocol (TCP) connection request; and
- receiving the TCP protocol connection request initiated by the DECT device, to establish a TCP channel with the DECT;

wherein the multicast probe message comprises a first multicast group ID, a Media Access Control (MAC) address of the DECT device and a first verification feature code;
- the sending status declaration information to the DECT device in a point-to-point manner based on the multicast probe message comprises: sending the status declaration information to the DECT device in a point-to-point manner based on a User Datagram Protocol (UDP) according to the MAC address of the multicast probe message after it is determined that the first multicast group ID is the same as a multicast group ID of the DECT host and the first verification feature code of the multicast probe message is verified.

6. A Digital Enhanced Cordless Telecommunications (DECT) network clustering method, comprising:
- sending, to a router, a multicast probe message sent to a target multicast group, wherein the multicast probe message comprises a Media Access Control (MAC) address of a DECT device;
- receiving status declaration information sent by a DECT host, and sending a Transmission Control Protocol (TCP) connection request to the DECT host according to the status declaration information, to establish a TCP channel;
- wherein after sending to the router the multicast probe message sent to the target multicast group, the DECT device retransmits the multicast probe message at intervals of second preset duration before the TCP channel is established between the DECT device and the DECT host.

7. The method according to claim 2, wherein the status declaration information comprises a second multicast group ID and a second verification feature code;
- after receiving the status declaration information, the DECT device further sends an acknowledgment message to the DECT host after it is determined that the second multicast group ID is the same as a multicast group ID of the DECT device and the second verification feature code of the status declaration information is verified; and
- after sending the status declaration information to the DECT device in a point-to-point manner according to the multicast probe message, the DECT host further retransmits the status declaration information at intervals of first preset duration if the acknowledgment message of the DECT device is not received and the number of retransmissions is less than a specified value.

8. The method according to claim 2, wherein the status declaration information comprises an IP address and a TCP listening port of the DECT host;
- the initiating a TCP protocol connection request to the DECT host in a point-to-point manner according to the status declaration information comprises: obtaining the IP address and the TCP listening port of the DECT host from the status declaration information, and initiating the TCP protocol connection request to the DECT host based on the IP address and the TCP listening port of the DECT host.

* * * * *